July 19, 1938.  W. STRUK ET AL  2,124,438

SOLDERED ARTICLE OR MACHINE PART

Filed Nov. 7, 1935

Inventors
Wilhelm Struk &
Hubert Schroeder
By Knight Bros
Their attorneys

Patented July 19, 1938

2,124,438

UNITED STATES PATENT OFFICE 2,124,438

SOLDERED ARTICLE OR MACHINE PART

Wilhelm Struk, Essen, and Hubert Schroeder, Essen-Steele, Germany, assignors, by mesne assignments, to General Electric Company, Schenectady, N. Y., a corporation of New York Application November 7, 1935, Serial No. 48,754
In Germany April 5, 1935

3 Claims. (Cl. 29—95)

This invention relates to articles or machine parts having a part soldered to the remainder, and it is particularly applicable to tools which comprise a cutting part made, for example of so-called hard metal soldered to a body or shank. It is well known that cracks often form in the cutting parts of such tools or the solder gives way so that the cutting part comes away from the body or shank. These phenomena are caused by internal stresses in the solder and cutting part produced on heating owing to the different co-efficients of expansion possessed by the solder and cutting part respectively. The stresses are set up directly the tool cools after the cutting part has been soldered on to the body or shank so that the cutting part often breaks away when it is being ground or during the first time that the tool is used. Moreover, internal stresses are produced every time the tool is subjected simultaneously to heating and stress. Attempts have already been made to prevent the setting up of such internal stresses by inserting intermediate layers of soft and tough material between the two parts during the soldering so that these intermediate layers are embedded in the solder and owing to their ability to yield can take up the internal stresses without being destroyed. The problem, however, has not been completely solved by the use of such intermediate layers since when the parts expand to different extents the intermediate layers can only yield to a limited extent.

According to the present invention the internal stresses are rendered harmless to an extent that is much greater than has hitherto been possible by using as the intermediate layer a piece of wire gauze made of iron, steel or other metal or alloy having a higher melting point than the solder. Advantageously the thickness of the wires composing the gauze may be one of from 0.1 to 0.3 mm. and the meshes from 0.3 to 1.5 mm. wide. It has been found that very good results are obtained when the gauze is cross-woven like linen. Gauze woven in this way is very yielding and therefore particularly suitable for use as the intermediate layer.

As a rule the soldered surfaces are substantially rectangular and it is found to be particularly advantageous to make the wires of the gauze run approximately parallel to the diagonals of the rectangle, because then the gauze can yield most in the direction of the major axis of the rectangle.

In order that the invention may be clearly understood and readily carried into effect the application of a cutting part or tip to a tool shank will now be described by way of example with reference to the accompanying drawing in which—

Figure 1:
Figures 1 and 2 show separate parts of the tool in elevation and plan respectively.
Figure 2:
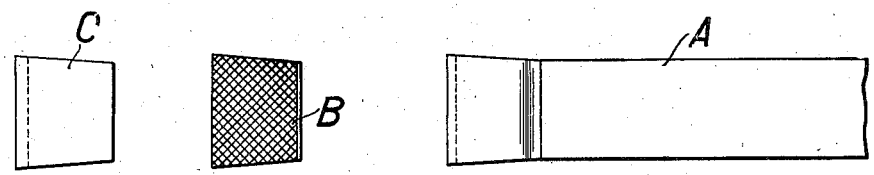
Figure 4:
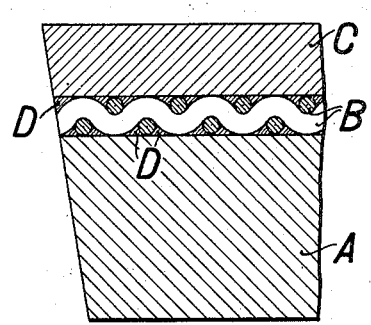
Figure 4 is a cross-section through the assembled tool on a larger scale.
Figure 3:
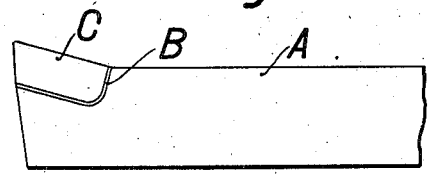
Figure 3 shows the assembled tool.

The tool consists of a shank A, a cutting part or tip in the form of a small hard metal plate C, and an intermediate layer B of wire gauze. This gauze has the cross weaving of linen and is so cut that the wires run approximately in the direction of the diagonals of the principal surface of the hard metal plate C. The parts are soldered together by means of any suitable solder, such for example as copper, brass or silver solder, which is shown at D in Figure 4. This solder serves to connect the separate parts of the tool firmly together, and the woven structure of the intermediate layer facilitates the penetration of the solder.

The intermediate layers used according to the invention have been found to be superior to all the inserts hitherto used in soldering. Their use is not restricted to cutting tools, and they may be used in general in any articles or machine parts connected by soldering, and with particular advantage in any tools subjected to considerable stresses.

What we claim and desire to secure by Letters Patent is:—

1. An article or machine part having two parts of widely different coefficients of expansion soldered together, the solder having embedded therein a piece of woven wire gauze of higher melting point than the solder, the soldered surfaces being substantially rectangular and the wires of the gauze being approximately parallel to the diagonals of the rectangle, said gauze being substantially in its original woven condition without fusion.

2. In combination, a metal cutting tool comprising a shank and a cutting tip, means for securing said tip to said shank, said means comprising a piece of woven wire gauze embedded in metal having a lower melting point than said wire gauze and interposed between said shank and tip, said wire gauze retaining its original form to thereby compensate for differences in expansion between said shank and said tip, said wire gauze having the cross weaving of linen, the wires of said gauze being approximately parallel to the diagonals of the adjacent surface of said tip.

3. In combination, a metal cutting tool comprising a shank and a cutting tip, means for securing said tip to said shank, said means comprising a piece of woven wire gauze embedded in metal having a lower melting point than said wire gauze and interposed between said shank and tip, said wire gauze retaining its original form to thereby compensate for differences in expansion between said shank and said tip, the wires of said gauze having a thickness of about .1 to .3 mm. and the meshes of said wire gauze being about .3 to 1.5 mm. wide, said wire gauze having the cross weaving of linen, the wires of said gauze being approximately parallel to the diagonals of the adjacent surface of said tip.

WILHELM STRUK.
HUBERT SCHROEDER.